United States Patent
Chi et al.

(10) Patent No.: US 12,555,815 B2
(45) Date of Patent: Feb. 17, 2026

(54) POUCH-SHAPED BATTERY CASE SHAPING APPARATUS INCLUDING VOLATILE LUBRICANT SUPPLY UNIT AND METHOD USING THE SAME

(71) Applicant: LG Energy Solution, Ltd., Seoul (KR)

(72) Inventors: Ho June Chi, Daejeon (KR); Hang June Choi, Daejeon (KR); Jeong Oh Moon, Daejeon (KR); Kyu Hyun Choi, Daejeon (KR); Jin Hak Kong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 520 days.

(21) Appl. No.: 17/924,567

(22) PCT Filed: Sep. 17, 2021

(86) PCT No.: PCT/KR2021/012768
§ 371 (c)(1),
(2) Date: Nov. 10, 2022

(87) PCT Pub. No.: WO2022/065815
PCT Pub. Date: Mar. 31, 2022

(65) Prior Publication Data
US 2023/0231173 A1    Jul. 20, 2023

(30) Foreign Application Priority Data
Sep. 25, 2020  (KR) .......................... 10-2020-0124896

(51) Int. Cl.
*H01M 10/04* (2006.01)
*H01M 50/105* (2021.01)

(52) U.S. Cl.
CPC ..... *H01M 10/0404* (2013.01); *H01M 50/105* (2021.01)

(58) Field of Classification Search
CPC ........................ H01M 10/0404; H01M 50/105
See application file for complete search history.

(56) References Cited

U.S. PATENT DOCUMENTS 3,756,051 A * 9/1973 Rebsamen ................. B21J 3/00
                                                    65/26
2012/0157573 A1   6/2012 Hirokane et al.
(Continued)

FOREIGN PATENT DOCUMENTS

EP    3309855 A1 *  4/2018
JP    H0687030 A    3/1994
(Continued)

OTHER PUBLICATIONS

Hoshiyama et al., JP 2017-001045 A, Machine Translation Jan. 5, 2017 (Year: 2017).*
(Continued)

*Primary Examiner* — Galen H Hauth
(74) *Attorney, Agent, or Firm* — Lerner David LLP

(57) ABSTRACT

A pouch-shaped battery case shaping apparatus includes a die having an open recess sized to correspond to an electrode assembly, a punch configured to draw a sheet into the open recess and thereby shape the sheet, a holder configured to fix ends of the sheet to the die during drawing of the sheet, and a lubricant supply unit configured to supply a lubricant to the sheet to minimize surface damage to the sheet due to the drawing of the sheet. A pouch-shaped battery case manufacturing process uses the pouch-shaped battery case shaping apparatus to shape the sheet.

14 Claims, 3 Drawing Sheets

(56) References Cited

U.S. PATENT DOCUMENTS

| | | |
|---|---|---|
| 2013/0340222 A1 | 12/2013 | Rompp et al. |
| 2014/0013590 A1 | 1/2014 | Norita et al. |
| 2014/0232034 A1 | 8/2014 | Kusawake et al. |
| 2015/0231683 A1 | 8/2015 | Norita et al. |
| 2016/0260542 A1 | 9/2016 | Kohno et al. |
| 2017/0028456 A1 | 2/2017 | Norita et al. |
| 2020/0066440 A1 | 2/2020 | Kohno et al. |
| 2020/0153025 A1 | 5/2020 | Kim et al. |
| 2021/0242485 A1 | 8/2021 | Kim et al. |

FOREIGN PATENT DOCUMENTS

| | | | |
|---|---|---|---|
| JP | H06087029 A | | 3/1994 |
| JP | H0739951 A | | 2/1995 |
| JP | 2002208384 A | | 7/2002 |
| JP | 2002216714 A | * | 8/2002 |
| JP | 2002292785 A | | 10/2002 |
| JP | 2006-247705 A | | 9/2006 |
| JP | 2007075835 A | * | 3/2007 |
| JP | 2007253219 A | | 10/2007 |
| JP | 2008-274256 A | | 11/2008 |
| JP | 2009113058 A | | 5/2009 |
| JP | 2011218367 A | | 11/2011 |
| JP | 2012216511 A | | 11/2012 |
| JP | 2014079806 A | | 5/2014 |
| JP | 2017001045 A | * | 1/2017 |
| JP | 6689571 B2 | | 4/2020 |
| JP | 2020077600 A | | 5/2020 |
| JP | 2020104127 A | | 7/2020 |
| JP | 2020127960 A | | 8/2020 |
| KR | 2003-0014487 A | | 2/2003 |
| KR | 20120046787 A | | 5/2012 |
| KR | 20140089377 A | | 7/2014 |
| KR | 20150060797 A | | 6/2015 |
| KR | 20160032280 A | | 3/2016 |
| KR | 20170089206 A | | 8/2017 |
| KR | 20180028194 A | | 3/2018 |
| KR | 20200052061 A | | 5/2020 |

OTHER PUBLICATIONS

Okushita et al, JP-2002216714 A, Machine Translation Aug. 2, 2002 (Year: 2002).*

Azuma et al, JP-2007-075835 A, Machine Translation Mar. 29, 2007 (Year: 2007).*

Liewald, Mathias, et al. "Volatile media as lubricant substitutes in deep drawing and tracking of individual workpieces in hot forging plants." Acta Technica NAPOCENSIS-Series: Applied Mathematics, Mechanics, and Engineering 61.4 (2018). (Year: 2018).*

International Search Report for Application No. PCT/KR2021/012768 mailed Dec. 27, 2021, 2 pages.

EESR for Application No. 21872843.4 dated Feb. 28, 2024. 10 pgs.

Wang, D. "Lubrication Technology Handbook" Mechanical Industry Press, Apr. 1999, 3 pages.

* cited by examiner

POUCH-SHAPED BATTERY CASE SHAPING APPARATUS INCLUDING VOLATILE LUBRICANT SUPPLY UNIT AND METHOD USING THE SAME

CROSS-REFERENCE TO RELATED APPLICATIONS

The present application is a national phase entry under 35 U.S.C. § 371 of International Application No. PCT/KR2021/012768 filed on Sep. 17, 2021, and now published as International Publication No. WO 2022/065815 A1, which claims priority from Korean Patent Application No. 10-2020-0124896 filed on Sep. 25, 2020, all of which are hereby incorporated herein by reference in their entireties.

FIELD

The present invention relates to a pouch-shaped battery case shaping apparatus including a volatile lubricant supply unit and a pouch-shaped battery case manufacturing method using the same. More particularly, the present invention relates to a pouch-shaped battery case shaping apparatus including a punch configured to shape a laminate sheet used as a pouch-shaped battery case into a cuboid, wherein the pouch-shaped battery case shaping apparatus further includes a volatile lubricant supply unit configured to supply a volatile lubricant used to minimize surface damage to the laminate sheet between the laminate sheet and the punch, and a pouch-shaped battery case manufacturing method using the same.

BACKGROUND

Demand for a secondary battery as an energy source for mobile devices and electric vehicles has abruptly increased. In particular, demand for a lithium secondary battery, which has high energy density and discharge voltage, is very high.

Based on the shape thereof, the lithium secondary battery may be classified as a cylindrical battery, a prismatic battery, or a pouch-shaped battery. The pouch-shaped battery has advantages in that the pouch-shaped battery can be stacked with high integrity, has high energy density per unit weight, is inexpensive, and is easily deformable. The pouch-shaped battery uses a laminate sheet as a battery case and is configured to have a structure in which an electrode assembly is received in a receiving portion formed in the laminate sheet together with an electrolytic solution.

The receiving portion of the pouch-shaped battery is formed by pressing a soft laminate sheet through deep drawing using a punch in the state in which the sheet is fixed. During deep drawing, external defects, such as pin-holes or cracks, are formed on the outer surface of the laminate sheet due to limited softness of the laminate sheet and frictional force applied upon pressing using the punch.

Even though surface roughness of the punch that contacts the laminate sheet is extremely reduced, frictional force is generated due to continuous work, whereby external defects are generated. Particularly, in the case in which the laminate sheet is configured to have a small thickness, shapeability of the sheet is reduced, whereby external defects are frequently generated. For this reason, there is limitation in manufacturing a large-capacity secondary battery by reducing the thickness of the battery case in order to increase the thickness of the electrode assembly.

In order to solve this problem, various attempts have been made. For example, a separate film is added to the laminate sheet, or the laminate sheet is punched twice or more.

Patent Document 1 relates to a warm working method of stainless steel foil and a mode for warm working, wherein austenite-based stainless steel foil having a thickness of 300 μm or less is disposed so as to face a punch, and stainless steel foil is drawn in the state in which a ring-shaped region of the stainless steel foil that a shoulder of the punch contacts is maintained at a temperature of 30° C. or less and a region of the stainless steel foil outside the ring-shaped region is maintained at a temperature of 40° C. to 100° C.

Patent Document 1 uses a heating method for drawing but does not disclose whether a lubricant is volatile and, furthermore, a method of removing the lubricant. For the pouch-shaped battery, the electrolytic solution directly contacts the laminate sheet. In the case in which the lubricant remains on the surface of the laminate sheet, therefore, performance of the secondary battery may be adversely affected.

Also, in Patent Document 1, stainless steel is processed. In order to increase softness of a metal, temperature may be raised. However, a temperature of a laminate sheet as described herein cannot be raised due to resin layers attached to inner and outer surfaces of the laminate sheet.

Patent Document 2 relates to a method of forming a compacted and pressed body including the following steps: a step of preparing raw material powder; a step of providing a lubricant for pressing between the outer circumferential surface of a first punch and the inner circumferential surface of a die and moving the first punch and the die relative to each other in this state to apply the lubricant for pressing to the inner circumferential surface of the die; a step of filling a cavity with the raw material powder and pressing the raw material powder to form a compacted and pressed body, wherein, in an application process, the lubricant for pressing is applied to the inner circumferential surface of the die while the lubricant for pressing is discharged through a supply port formed in the first punch and the discharged lubricant for pressing is collected through a discharge port formed in the first punch.

In Patent Document 2, the lubricant is supplied through a separate supply unit and is collected through a separate collection unit. In Patent Document 2, the material to be processed is powder, and therefore a lubricant capable of surviving for a predetermined time is inevitably necessary in order to reduce frictional force between powder particles that may be generated during the pressing process, and a means capable of collecting the lubricant must be provided. The material to be pressed in Patent Document 2 is powder, which is very different from the laminate sheet used in the present disclosure in terms of physical properties.

Patent Document 3 relates to a rolling tool, and more particularly to a rolling tool for machining the inner surface of a cylindrical gap in a lateral direction, particularly for smooth surface rolling. The rolling tool disclosed in Patent Document 3 includes at least one rolling body provided in the rolling tool, which is rotatable, the rolling body being picked by the tool along the inner surface of the cylindrical gap in the lateral direction. In this case, the at least one rolling body may be inserted into the gap of the rolling tool in a radial direction and may be put under a fluid pressurized from inside to outside along the gap in the radial direction. In Patent Document 3, an aerosol is used as the fluid. The aerosol of Patent Document 3 is a fluid mixed with gas and is used for a static bearing and lubrication. This aerosol type lubricant is used in a specific technical field and is irrelevant to the laminate sheet shaping apparatus according to the present invention.

Patent Document 4 relates to a battery case shaping apparatus including a low-friction punch head, which is an apparatus for forming a battery case including an electrode assembly receiving portion in which an electrode assembly is received. The shaping apparatus of Patent Document 4 includes a die having a depressed type or penetrated type open recess having a size corresponding to an electrode assembly receiving portion, a sheet base material for manufacture of a battery case being located at the upper surface of the die, a punch having a shape corresponding to the open recess, the punch being located above the open recess to perform deep drawing with respect to the sheet base material, the punch including a punch head configured to be introduced into the open recess when being moved downwards, the punch head being made of a low coefficient of friction material, and a holder configured to press opposite ends of the sheet base material so as to be fixed to the die for deep drawing.

As previously described, in the case in which strength of a material is high, heat is generated due to continuous working even though surface roughness is reduced to lower frictional force, whereby external defects, such as pin-holes or cracks, are formed in the laminate sheet. In Patent Document 4, frictional force is lowered, and the punch is made of a resin, such as polytetrafluoroethylene, in order to prevent occurrence of wrinkles and efflorescence at a corner of the receiving portion at the time of deep drawing.

The laminate sheet has been used as a case of the pouch-shaped battery for a long time; however, this is technology suitable to manufacture a pouch-shaped battery suitable for past markets. A shaping apparatus having a low defect rate while providing for a high-capacity battery based on a recent market environment change and a pouch-shaped battery case manufacturing method using the same have not yet been suggested.

Korean Patent Application Publication No. 2015-0060797 (2015.06.03) "Patent Document 1"
Korean Patent Application Publication No. 2014-0089377 (2014.07.14) "Patent Document 2"
Korean Patent Application Publication No. 2016-0032280 (2016.03.23) "Patent Document 3"
Korean Patent Application Publication No. 2018-0028194 (2018.03.16) "Patent Document 4"

SUMMARY OF THE DISCLOSURE

The present invention has been made in view of the above problems, and it is an object of the present invention to provide an effective pouch-shaped battery case shaping apparatus capable of, in shaping a pouch-shaped battery case:
1) minimizing surface damage that may occur at the outer surface of a laminate sheet;
2) preventing formation of pin-holes or cracks when shaping a thin laminate sheet;
3) without making significant changes to a conventional shaping apparatus and a method using the same;
4) using a conventional laminate sheet without change; and
5) preventing the presence of residuals after shaping, and a pouch-shaped battery case manufacturing method using the same.

In order to accomplish the above object, the present invention provides a pouch-shaped battery case shaping apparatus including:
a die having a depressed type or penetrated type open recess having a size corresponding to an electrode assembly, a sheet being located at the upper surface of the die; a punch having a shape corresponding to the open recess, the punch being located above the open recess to perform deep drawing with respect to the sheet, the punch including a punch head configured to be introduced into the open recess when being moved downwards; a holder configured to press opposite ends of the sheet so as to be fixed to the die for deep drawing; and a lubricant supply unit configured to supply a lubricant to the upper surface of the sheet that abuts the punch head.

The pouch-shaped battery case shaping apparatus may not be provided with a separate lubricant collection unit configured to collect the lubricant supplied to the upper surface of the sheet, and the lubricant supply unit may supply the lubricant to only a portion of the sheet that is drawn.

The lubricant according to the present invention may be a no-clean lubricant or a volatile lubricant, e.g. a lubricant that is volatile by heat generated due to shaping or at normal temperature when remaining after processing. The volatile lubricant according to the present invention does not require a separate degreasing process. In order to improve lubricity, a very small amount of oily agent may be mixed. The volatile lubricant according to the present invention may be more rapidly dried through air blowing or using hot air.

A lubricant is used in conventional metal pressing. The outer layer of the laminate sheet according to the present invention is a resin layer. In the case in which a lubricant, particularly a volatile lubricant, is used in conventional metal pressing, a problem may occur. The volatile lubricant may exhibit properties similar to properties of a detergent due to high volatility thereof, and may easily penetrate the resin layer, whereby the surface of the laminate sheet may be stained. Stained products are discarded as defective products.

Consequently, a lubricant that does not permeate the resin layer must be used. In this case, however, volatility of the lubricant is low, and therefore a separate washing process is needed after processing.

The present invention has been made in view of a problem when shaping is performed using such a volatile lubricant and provides a pouch-shaped battery case shaping apparatus configured such that an injection nozzle and a punch are disposed so as to be very close to each other, a volatile lubricant is supplied immediately before shaping, and the lubricant is removed through air blowing or using hot air after shaping.

As a result, it is possible to solve a problem in that defects, such as stains, occur and to prevent damage, such as pin-holes or cracks, which may occur at the time of shaping.

In the present invention, the sheet may include a laminate sheet. All laminate sheets may be used as long as the laminate sheets can be used for pouch-shaped batteries.

For example, the laminate sheet according to the present invention may be configured to have a structure in which a first resin layer having thermal fusibility, a metal layer having material blocking properties, and a second resin layer, which is an outer layer, are stacked or a structure in which a resin layer having thermal fusibility and a metal layer having material blocking properties are stacked.

The first resin layer having thermal fusibility may be made of a material that has low hygroscopicity and that is neither expanded nor eroded by an electrolytic solution, such as a polyolefin-based resin.

The metal layer having material blocking properties may be made of, for example, aluminum or an aluminum alloy in order to increase strength of the battery case in addition to a function of preventing introduction or leakage of foreign matter, such as gas or moisture.

The second resin layer, which is a polymer resin layer forming the outer layer of the battery case, requires predetermined tensile strength and weather resistance such that the second resin layer has excellent resistance to an external environment. The second resin layer may be made of, for example, polyethylene terephthalate (PET) or oriented nylon.

The portion of the punch head that abuts the sheet may be made of at least a low coefficient of friction material. The low coefficient of friction material may be any one selected from the group consisting of polyether ether ketone (PEEK), polyethylene terephthalate (PET), polyimide (PI), polyphenylene sulfide (PPS), polypropylene (PP), polyethylene (PE), and nylon.

The portion of the punch head that abuts the sheet may include at least a temperature adjustment unit configured to raise or lower temperature. In the case in which temperature is raised, softness of the sheet may be increased, and the lubricant remaining after deep drawing may be rapidly sublimed or evaporated.

The lubricant supply unit may include an injection nozzle configured to inject a lubricant in an aerosol state, and the injection nozzle may be fixed to the holder.

In addition, the present invention provides a pouch-shaped battery case manufacturing method using the pouch-shaped battery case shaping apparatus, the pouch-shaped battery case manufacturing method including (S1) disposing the sheet between the die and the punch; (S2) applying the lubricant to the portion of the sheet that contacts the punch head; and (S3) shaping the sheet into the battery case using the punch.

The lubricant may be simultaneously applied to the surface of the punch head and the surface of the sheet, and step (S2) may be performed using a method of injecting a lubricant in an aerosol state. The injection nozzle fixed to the holder may inject the lubricant in the aerosol state.

The present invention may provide a method of attaching a film member for shaping to the upper surface of the laminate sheet, shaping a battery case, and separating the film member for shaping.

The film member for shaping may include a substrate film and an adhesive layer formed on one surface of the substrate film so as to be separably attached to the laminate sheet. The substrate film may be a polymer resin film, a metal film, or a composite film thereof. The film member for shaping may have a single-layer structure including a substrate film and an adhesive layer or a multilayer structure in which two or more substrate films and two or more adhesive layers are alternately stacked. The polymer resin film may include at least one selected from the group consisting of polyethylene terephthalate (PET), polyimide (PI), polyphenylene sulfide (PPS), polypropylene (PP), polyethylene (PE), and nylon. The film member for shaping may have a quadrangular shape having a size capable of covering a portion to be shaped by deep drawing when viewed in plan.

In the present invention, step (S3) may include a process of pressing the laminate sheet using the punch to draw the laminate sheet to a first depth and a process of further pressing the laminate sheet drawn to the first depth such the laminate sheet is further drawn to a second depth equivalent to 105% to 200% of the first depth.

Shapeability of a general laminate sheet is increased when the thickness of the laminate sheet is increased. In the opposite case, however, shapeability of the laminate sheet is decreased. Consequently, it is difficult to reduce the thickness of the battery case while securing shapeability of the sheet.

In the battery case manufacturing method according to the present invention, deep drawing may be performed in the state in which the film member for shaping is further attached to the laminate sheet while the volatile lubricant is applied to the laminate sheet. In this case, it is possible to disperse stress excessively concentrated on the portion of the laminate sheet that is drawn, whereby it is possible to minimize external defects of the sheet and to improve shapeability of the sheet.

After the electrode assembly receiving portion is formed, the film member may be separated from the sheet in order to form a receiving portion having a small thickness. As a result, it is possible to increase the number of electrode assemblies that can be received in a single battery cell, and therefore it is possible to provide a battery case for secondary batteries having high energy density.

In deep drawing for shaping the laminate sheet into the battery case, the entirety of the laminate sheet is not uniformly drawn, and only a specific region is excessively drawn to form the receiving portion. For this reason, a considerable amplitude of stress is applied to the portion of the laminate sheet that is intensively drawn, whereby defects, such as cracks or pin-holes, may occur. In the present invention, the volatile lubricant is applied to the stressed portion in order to reduce frictional force at the stressed portion and to prevent only the stressed portion from being excessively drawn.

Meanwhile, in order to prevent only the stressed portion from being excessively drawn, a process of pressing the laminate sheet using the punch to draw the laminate sheet to a first depth and a process of further pressing the laminate sheet drawn to the first depth such the laminate sheet is further drawn to a second depth equivalent to 105% to 200% of the first depth may be performed. At this time, it is preferable for the first depth to be 2 mm to 10 mm.

In addition, the present invention may provide a laminate sheet in the state in which a film member is attached thereto. Specifically, a laminate sheet for deep drawing used to manufacture a battery case by forming a receiving portion configured to receive an electrode assembly by deep drawing may be a stacked sheet including a first resin layer having thermal fusibility, a metal layer having material blocking properties, and a second resin layer, which is an outer layer, or a stacked sheet including a resin layer having thermal fusibility and a metal layer having material blocking properties, and the film member for shaping may be separably attached to one surface or opposite surfaces of the stacked sheet.

Laminate sheets having various thicknesses may be used based on the use or purpose of the battery case. For example, a conventional battery case manufactured using a sheet having a thickness of 200 μm may be manufactured using a sheet having a smaller thickness with improved shapeability. As a result, it is possible to provide a battery case having a receiving portion having a smaller thickness than in the conventional battery case.

In addition, the present invention may provide all possible combinations of the above solving means.

In order to solve the above problems, the present invention may provide an effective pouch-shaped battery case shaping apparatus capable of, in shaping a pouch-shaped battery case:

1) minimizing surface damage that may occur at the outer surface of a laminate sheet;
2) preventing formation of pin-holes or cracks when shaping a thin laminate sheet;
3) without making significant changes to a conventional shaping apparatus and a method using the same;
4) using a conventional laminate sheet without change; and
5) preventing the presence of residuals after shaping, and a pouch-shaped battery case manufacturing method using the same.

As is apparent from the above description, in the battery case manufacturing method according to the present invention, deep drawing is performed in the state in which the volatile lubricant is applied to the laminate sheet, whereby it is possible to disperse stress excessively concentrated on the portion of the laminate sheet that is drawn, and therefore it is possible to improve shapeability of the sheet. After the receiving portion is formed, the volatile lubricant is sublimed or evaporated, whereby it is possible to provide a battery case having minimized external defects and a reduced thickness.

DETAILED DESCRIPTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but rather means that such elements may be further included unless mentioned otherwise.

In addition, a description to embody elements through limitation or addition may be applied to all inventions, unless particularly restricted, and does not limit a specific invention.

Also, in the description of the present disclosure and the claims of the present application, singular forms are intended to include plural forms unless mentioned otherwise.

Also, in the description of the present disclosure and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present disclosure will be described in detail with reference to the accompanying drawings.

Figure 1:
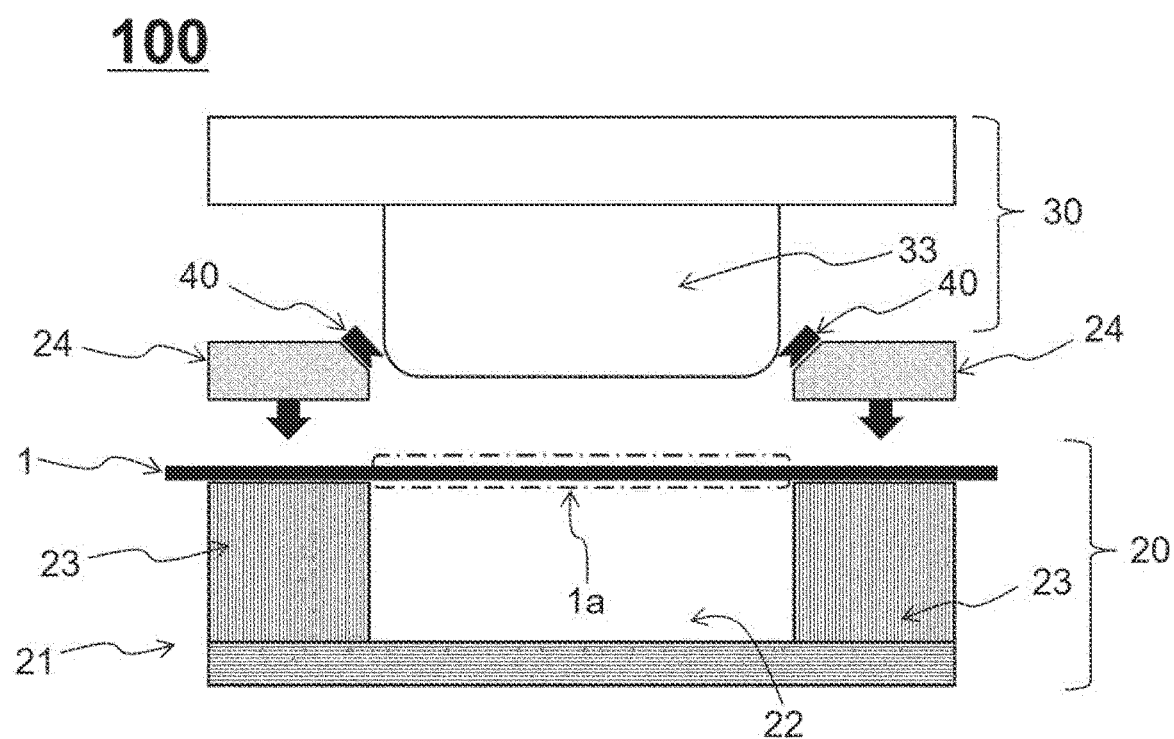
FIG. 1 is a schematic side view of a pouch-shaped battery case shaping apparatus according to an embodiment.

FIG. 1 is a schematic elevation view of a pouch-shaped battery case shaping apparatus according to an embodiment of the present invention.

Referring to FIG. 1, the shaping apparatus 100, which is an apparatus for shaping a laminate sheet 1 to form a receiving portion configured to receive an electrode assembly, includes a die assembly 20 and a punch 30.

The die assembly 20, which is a construction for fixing an outer circumferential portion of the laminate sheet 1 adjacent to a portion to be shaped 1a of the laminate sheet 1 in place, includes a die 21, which includes a depressed portion 22 formed in a shape corresponding to the receiving portion and an outer circumferential wall 23 located at opposite sides of the depressed portion 22 when viewed in plan, the laminate sheet 1 being mounted to the upper end of the outer circumferential wall, and a holder 24 located at a position corresponding to the upper side of the outer circumferential wall 23, the holder being configured to press the outer circumferential portion of the laminate sheet 1 downwards so as to be fixed in place.

The punch 30 is a construction for pressing the portion to be shaped 1a of the laminate sheet 1 fixed in place by the die assembly 20 to shape the laminate sheet 1 by deep drawing in order to form the receiving portion. The outer edge of a punch head 33, which is a component constituting the punch 30 and which is to be introduced into an open recess when being moved downwards, is round such that the laminate sheet 1 is not damaged when the laminate sheet 1 is drawn by deep drawing. Although the punch head 33 is sometimes called a punch, a portion corresponding thereto is referred to herein as a punch head 33 and the entirety including the same is referred to herein as a punch 30.

The laminate sheet 1 is located between the stationary die 21 and the holder 24. More specifically, the outer circumferential portion of the laminate sheet 1 excluding the portion to be shaped 1a is mounted to the upper end of the outer circumferential wall 23 of the stationary die 21, and the holder 24 is located at an upper side corresponding thereto. In addition, an injection nozzle 40 configured to supply a volatile lubricant is provided at one side surface of the holder 24.

The injection nozzle 40 does not overlap a moving portion of the punch head 33, and preferably applies a volatile lubricant to the portion to be shaped 1a, more preferably to the portion of the laminate sheet 1 that is drawn by the punch head 33. FIG. 1 shows that the injection nozzle 40 is fixed to an inclined surface of the holder 24 that is formed at a portion thereof, which, however, is merely an example. The injection nozzle may be fixed to any place as long as the injection nozzle 40 does not interfere with a movement path of the punch head 33 while applying a volatile lubricant to a target portion of the upper surface of the laminate sheet 1.

FIG. 1 shows two injection nozzles 40; however, the number of injection nozzles may be changed as needed.

The portion of the punch head 33 that abuts the laminate sheet 1 may include at least a temperature adjustment unit (not shown) configured to raise or lower temperature. In the case in which temperature is raised, softness of the sheet may be increased, and the lubricant remaining after deep drawing may be rapidly sublimed or evaporated.

The shaping apparatus 100 may not be provided with a separate lubricant collection unit configured to collect the volatile lubricant. The volatile lubricant may be very rapidly evaporated after the volatile lubricant is applied to the laminate sheet 1 and the laminate sheet 1 is shaped by deep drawing, whereby no separate lubricant collection unit is necessary.

FIGS. 2 to 5 are schematic views showing a series of processes of manufacturing a battery case according to an embodiment.

Figure 2:
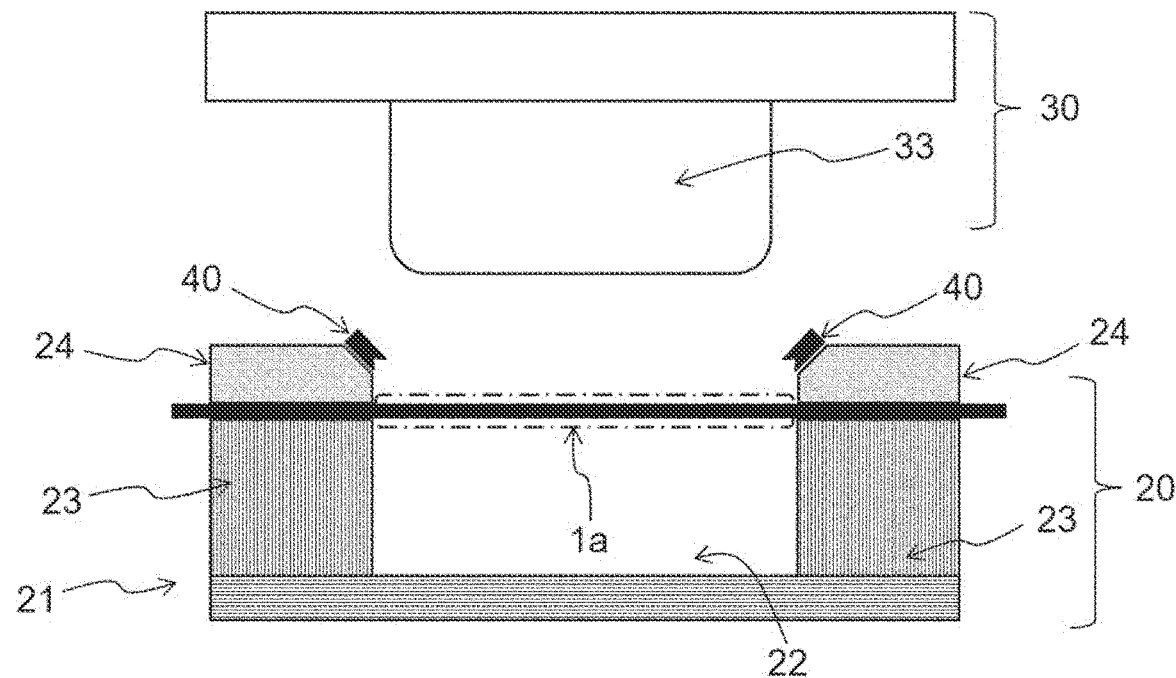
FIGS. 2 to 5 are schematic views showing a series of processes of manufacturing a battery case using the battery case shaping apparatus of FIG. 1 according to an embodiment.

Referring to FIG. 2, the lower surface of a laminate sheet 1 is fixed to the die assembly 20, and the punch 30 configured to press a portion to be shaped 1a is located above the laminate sheet 1.

Referring to FIG. 1 together with FIG. 2, the upper surface of the laminate sheet 1 is pressed by the holder 24 so as to be fixed in place in the state in which the lower surface of the laminate sheet 1 is fixed to the upper end of the outer circumferential wall 23 of the stationary die 21. After the laminate sheet 1 is fixed in place by the die assembly 20, a deep drawing process is performed to form a receiving portion. Before the deep drawing process is performed, a volatile lubricant is applied to the laminate sheet through the injection nozzle 40.

Figure 3:
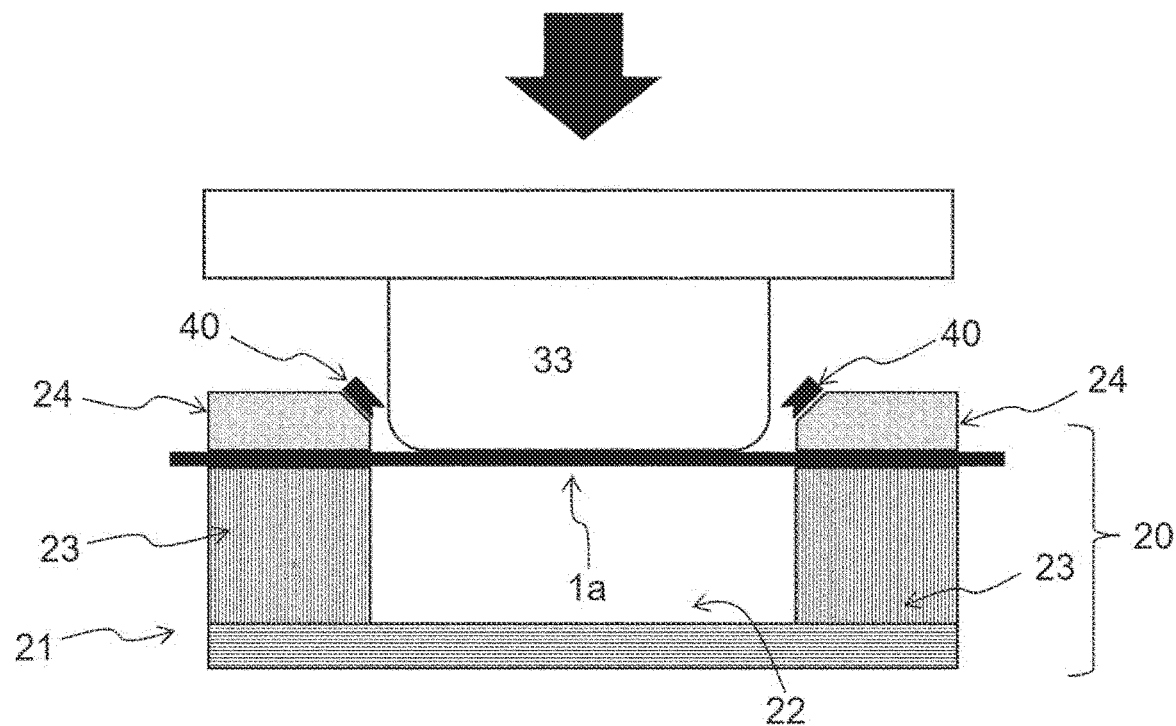

Referring to FIG. 3, there is shown the state in which the punch 30 abuts the upper surface of the laminate sheet 1 before the receiving portion is formed in the laminate sheet 1. At this time, the injection nozzle 40 does not interfere with the movement trajectory of the punch 30.

The punch 30 straightly moves in a direction indicated by an arrow in a state of being located above the laminate sheet 1, whereby the lower end surface of the punch abuts the upper surface of the portion to be shaped 1a.

Figure 4:
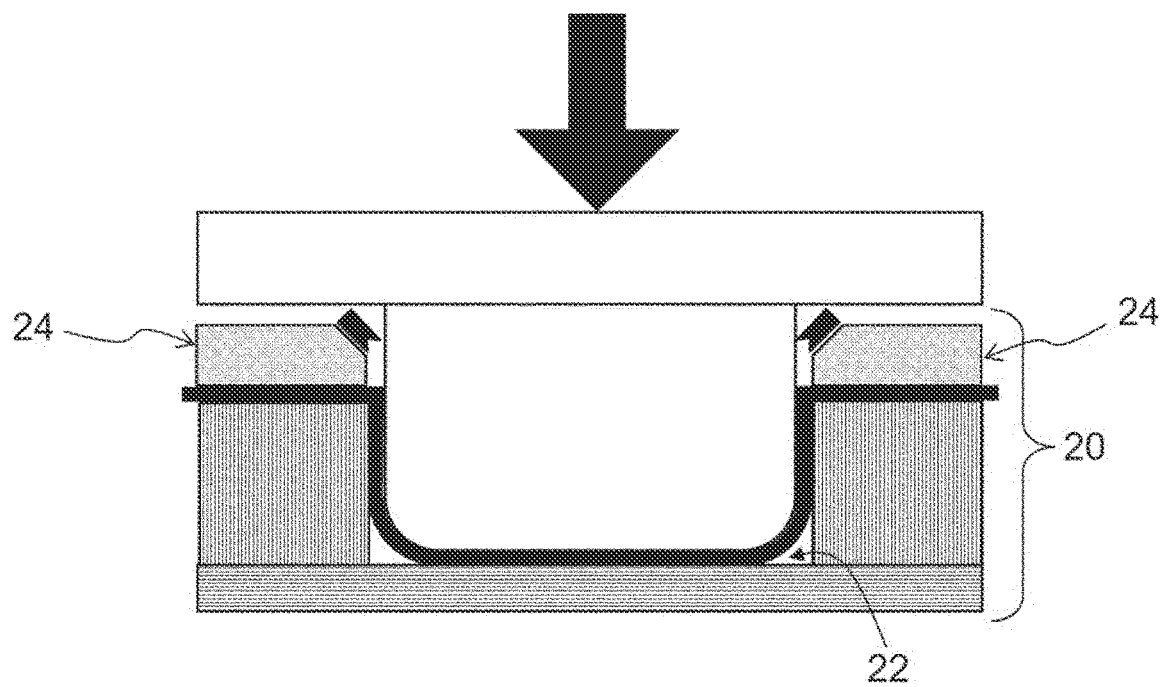

Next, referring to FIG. 4, there is schematically shown a process in which the portion to be shaped 1a of the laminate sheet 1 is pressed by the punch to form the receiving portion in the laminate sheet 1.

This process is subsequently performed in the state in which the punch 30 abuts the laminate sheet 1. The punch straightly moves in a direction indicated by an arrow to press the laminate sheet 1 such that the receiving portion is formed in the laminate sheet 1.

Specifically, referring to FIGS. 1 and 4, the punch 30 presses the portion to be shaped 1a of the laminate sheet 1 fixed by the die assembly 20 until the portion to be shaped comes into tight contact with the inner surface of the depressed portion 22 to form the receiving portion.

Figure 5:

Next, referring to FIG. 5, there is shown the state in which the laminate sheet 1 having the receiving portion formed therein is finally manufactured.

As previously described, the deep drawing process, in which the volatile lubricant is applied to the laminate sheet through the injection nozzle 40 and the receiving portion is formed in the laminate sheet, is performed, whereby it is possible to minimize external defects of the laminate sheet 1, to improve shapeability of the laminate sheet 1 that is drawn, and to reduce the thickness of a battery case manufactured therefrom.

Those skilled in the art to which the present invention pertains will appreciate that various applications and modifications are possible within the category of the present invention based on the above description.

DESCRIPTION OF REFERENCE SYMBOLS

100: Shaping apparatus according to present invention
1: Laminate sheet
1a: Portion to be shaped
20: Die assembly
21: Die
22: Depressed portion
23: Outer circumferential wall
24: Holder
30: Punch
33: Punch head
40: Injection nozzle The present invention relates to a pouch-shaped battery case shaping apparatus including a punch configured to shape a laminate sheet used as a pouch-shaped battery case into a cuboid, wherein the pouch-shaped battery case shaping apparatus further includes a volatile lubricant supply unit configured to supply a volatile lubricant used to minimize surface damage to the laminate sheet between the laminate sheet and the punch, and a pouch-shaped battery case manufacturing method using the same. Consequently, the present invention has industrial applicability.

The invention claimed is:

1. A pouch-shaped battery case shaping apparatus, the shaping apparatus configured for shaping a sheet into the battery case and comprising:
   a die having an open recess having a size corresponding to an electrode assembly;
   a punch having a shape corresponding to the open recess, the punch comprising a punch head configured to draw the sheet into the open recess and thereby shape the sheet;
   a holder configured to hold opposite ends of the sheet so as to be fixed to the die while the punch draws the sheet; and
   a lubricant supply unit configured to supply a lubricant to a punch-facing surface of the sheet that abuts the punch head such that the punch-facing surface of the sheet is lubricated when the sheet is drawn,
   wherein the lubricant supply unit comprises an injection nozzle configured to inject a lubricant in an aerosol state, the injection nozzle fixed to an inclined surface of the holder, and
   wherein the apparatus is configured such that at the completion of the drawing of the sheet by the punch, confronting surfaces of the punch and the holder are spaced apart from one another by a gap, and the injection nozzle is located within the gap.

2. The pouch-shaped battery case shaping apparatus according to claim 1, wherein the shaping apparatus lacks a separate lubricant collection unit configured to collect the lubricant supplied to the punch-facing surface of the sheet.

3. The pouch-shaped battery case shaping apparatus according to claim 1, wherein the lubricant supply unit is configured to supply the lubricant to only a portion of the sheet that is drawn.

4. The pouch-shaped battery case shaping apparatus according to claim 1, wherein the lubricant is a volatile lubricant.

5. The pouch-shaped battery case shaping apparatus according to claim 1, wherein the sheet comprises a laminate sheet.

6. The pouch-shaped battery case shaping apparatus according to claim 1, wherein a portion of the punch head that abuts the sheet, when the punch head draws the sheet, is made of at least a low coefficient of friction material.

7. The pouch-shaped battery case shaping apparatus according to claim 1, wherein a portion of the punch head that abuts the sheet comprises a temperature adjustment unit configured to raise or lower temperature.

8. A pouch-shaped battery case manufacturing method using the pouch-shaped battery case shaping apparatus according to claim 1, the pouch-shaped battery case manufacturing method comprising:
- (S1) disposing the sheet between the die and the punch;
- (S2) applying the lubricant to a portion of the sheet; and
- (S3) shaping the sheet into the battery case using the punch whereby the punch head contacts the lubricant.

9. The pouch-shaped battery case manufacturing method according to claim 8, simultaneously applying the lubricant to a surface of the punch head and a surface of the sheet.

10. The pouch-shaped battery case manufacturing method according to claim 9, wherein step (S2) includes injecting a lubricant in an aerosol state.

11. The pouch-shaped battery case manufacturing method according to claim 10, wherein an injection nozzle fixed to the holder injects the lubricant in the aerosol state.

12. The pouch-shaped battery case shaping apparatus according to claim 1, wherein the punch is located above the open recess to perform deep drawing with respect to the sheet and is configured to move downwards to draw the sheet.

13. The pouch-shaped battery case shaping apparatus according to claim 1, further comprising the sheet, wherein the sheet is held by the holder and extends across the open recess before being the punch draws the sheet.

14. The pouch-shaped battery case shaping apparatus according to claim 1, wherein the lubricant supply unit is fixed to the holder.

* * * * *